United States Patent [19]

Pichler

[11] 4,441,722

[45] Apr. 10, 1984

[54] ROTARY BIDIRECTIONAL DYNAMIC SHAFT SEAL HAVING A PUMPING PROJECTION WITH ANGULATED PRIMARY AND SECONDARY PUMPING SURFACES

[75] Inventor: Gerald P. Pichler, Dearborn, Mich.

[73] Assignee: Federal-Mogul Corporation, Detroit, Mich.

[21] Appl. No.: 375,926

[22] Filed: May 7, 1982

[51] Int. Cl.³ .............................................. F16J 15/32
[52] U.S. Cl. .................................... 277/134; 277/96.1
[58] Field of Search ...................... 277/152, 153, 96.2, 277/134, 96.1

[56] References Cited

U.S. PATENT DOCUMENTS

| | | | |
|---|---|---|---|
| 3,586,342 | 6/1971 | Staab | 277/134 |
| 3,838,862 | 10/1974 | Fern | 277/96.1 |
| 3,868,105 | 2/1975 | Bentley | 277/134 |
| 3,873,104 | 3/1975 | Bainard | 277/134 |
| 3,895,814 | 7/1975 | Kupfert et al. | 277/134 |

*Primary Examiner*—Robert I. Smith

[57] ABSTRACT

A rotary bidirectional dynamic shaft seal (10) for maintaining a seal about a rotating shaft (12) to prevent the leakage of oil from the oil side of the seal past a sealing edge (18) to the air side. The seal (10) includes a plurality of pumping projections extending from the frustoconical surface (22) on the air side of the seal for pumping oil, which may leak past the sealing edge (18) back to the oil side of the seal. The pumping projection has a primary pumping surface (24) extending axially from the sealing edge (18) and a secondary pumping surface (28) extending at a shadow angle (A) away from the primary pumping (24) surface to a return surface (26) which extends generally radially to define the rear extremity of the pumping projection. Under normal operating conditions, the primary pumping surface (24) will return oil to the oil side of the sealing edge (18). However, should the shaft (12) be misaligned or be running eccentrically, the primary pumping surface (24) will engage the shaft on the minimum contact side whereas on the maximum contact side 180 degrees away, both the primary (24) and secondary (28) pumping surfaces will engage the shaft (12) to pump oil back to the oil side of the sealing edge (18).

7 Claims, 8 Drawing Figures

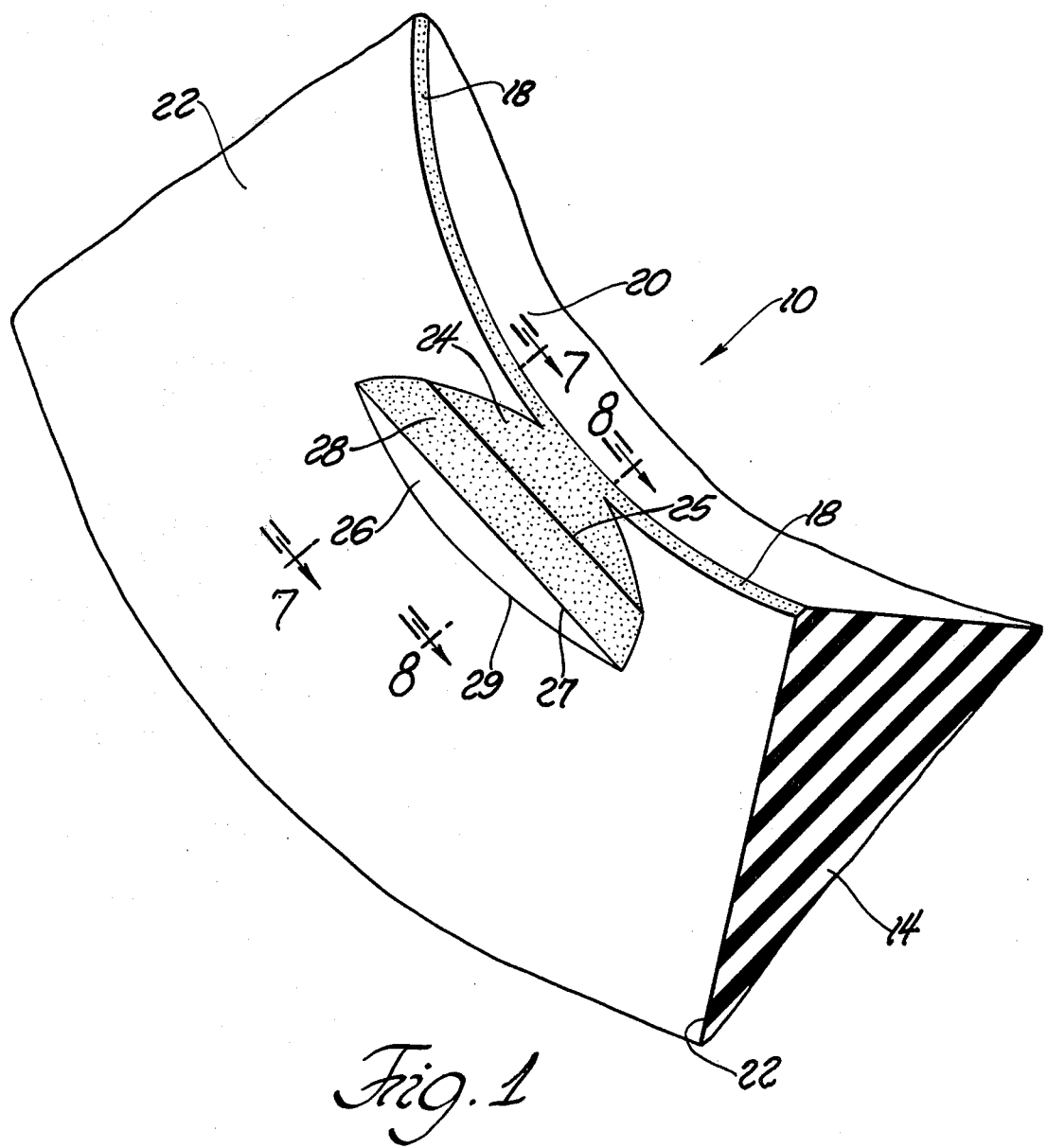
 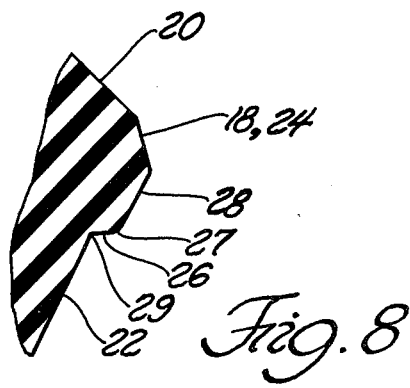

ROTARY BIDIRECTIONAL DYNAMIC SHAFT SEAL HAVING A PUMPING PROJECTION WITH ANGULATED PRIMARY AND SECONDARY PUMPING SURFACES

TECHNICAL FIELD

This invention relates to a rotary bidirectional dynamic shaft seal to effect a seal about a rotating shaft regardless of the direction of rotation of the shaft. The seal includes elastomeric material supported on an annular casing and including an annular sealing edge or lip defined by first and second converging frustoconical surfaces. The first frustoconical surface is on the so-called wet or oil side of the sealing edge and the second frustoconical surface is on the so-called dry, exterior or air side of the sealing edge. The sealing edge effects the seal with the shaft to prevent oil from leaking to the air side.

BACKGROUND ART

In order to improve the performance of the dynamic shaft seal having a sealing edge engaging a rotating shaft, as described above, the sealing edge has been provided a hydrodynamic assist. This hydrodynamic assist was initially provided by helically disposed ribs or grooves which, together with the rotating shaft, create a hydraulic pressure affect on the oil to force the oil back under the sealing edge. However, because of the helical disposition of the ribs or grooves, the hydrodynamic assist was effective for only one direction of rotation of the shaft.

Consequently, shaft seals have been developed to provide the hydrodynamic assist on the air or dry side of the sealing edge to pump oil which leaks past the sealing edge back under the sealing edge to the oil or wet side. Projections of various configurations have been provided on the frustoconical surface adjacent the sealing edge on the air or dry side to engage the shaft and pump oil back under the sealing edge to the wet or oil side. Examples of such pumping projections are shown in the U.S. Pat. No. 3,656,227 granted Apr. 18, 1972 to Louis H. Weinand, U.S. Pat. No. 3,586,342 granted June 22, 1971 to Thomas E. Staab, U.S. Pat. No. 3,873,104 granted Mar. 25, 1975 to Dean R. Bainard, U.S. Pat. No. 3,868,105 granted Feb. 25, 1975 to G. A. Bentley, and U.S. Pat. No. 3,895,814 granted July 22, 1975 to Bernard F. Kupfert et al. The pumping projections shown in these patents include one singular pumping surface for engaging the shaft.

Under some operating conditions, the shaft may be misaligned or run eccentrically. When the shaft runs eccentrically, the axis of the shaft is offset from the axis of the seal whereby the shaft runs in tighter or firmer contact with one peripheral portion of the seal and in looser contact with the portion of the seal 180 degrees about the seal from the first portion. On the light contact side, the pumping projection might not be in contact with the shaft at all with only the sealing edge being in contact with the shaft or, if in contact, may not yield an effective hydrodynamic pattern. On the high contact side only the rear heel of the pumping projection may be contacting the shaft with the adjacent sealing edge out of contact with the shaft, thus resulting in leaking.

STATEMENT OF INVENTION AND ADVANTAGES

The subject invention provides a rotary bidirectional, dynamic shaft seal wherein the pumping projection has a primary pumping surface extending generally axially from the sealing edge in spaced relation to the adjacent frustoconical surface and also a return surface extending upwardly from the frustoconical surface to define the rear extremity of the pumping projection. The invention is characterized by including a secondary pumping surface extending between the primary pumping surface and the return surface at a shallow angle relative to the primary pumping surface.

The advantage to such a dual angle pumping projection is that during normal and expected seal and shaft contact where the shaft is not misaligned or running with some eccentricity, the primary pumping surface would engage the shaft and pump the oil back under the sealing edge to the oil side. However, should the shaft run misaligned or with some eccentricity, the high contact side of the assembly would be such that both the primary and secondary pumping surfaces would be in engagement with the shaft. On the light contact side, the primary pumping surface would be in contact with the shaft and provide an acceptable hydrodynamic pattern. On both sides, the sealing edge would remain in engagement with the shaft.

FIGURES OF THE DRAWINGS

Other advantages of the present invention will be readily appreciated as the same becomes better understood by reference to the following detailed description when considered in connection with the accompanying drawings wherein:

FIG. 1 is an enlarged fragmentary perspective view showing a shaft seal including the pumping projection of the subject invention;

FIG. 7 is a cross-sectional view taken substantially along line 7—7 of FIG. 1; and FIG. 8 is a cross-sectional view taken substantially along line 8—8 of FIG. 1.

DETAILED DESCRIPTION OF THE DRAWINGS

Figure 2:
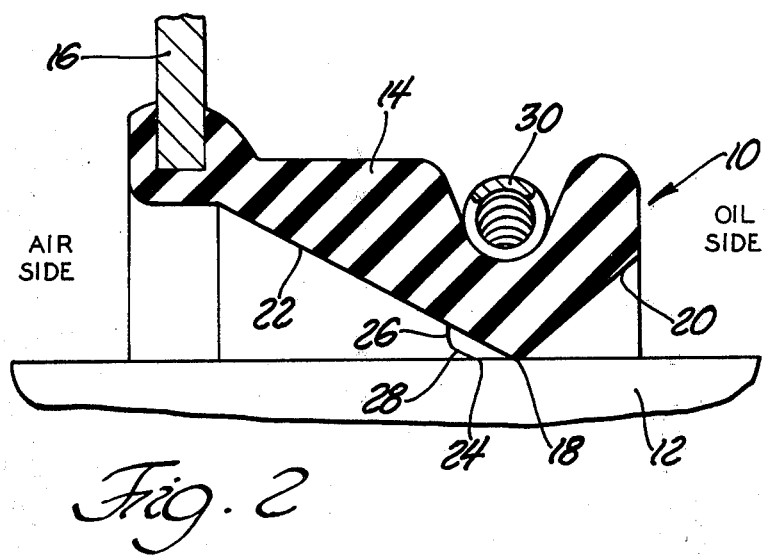
FIG. 2 is a fragmentary cross-sectional view showing the shaft seal in engagement with the shaft in the normal running condition.

A rotary bidirectional dynamic shaft seal for sealing between a pair of relatively rotative members, one of which rotates about an axis, is generally shown at 10 in FIGS. 1 and 2. As illustrated, the shaft seal effects a seal between a wet or oil side and an air or dry side on the surface of a rotating shaft 12, which shaft rotates about an axis.

The seal 10 includes an elastomeric member 14 which supported by an annular metal casing 16, the elastomeric member 14 being adhesively or otherwise secured to the annular casing 16.

The member 14 defines a radially inwardly extending, annular sealing edge 18 defined by or at the intersection of first and second converging frustoconical surfaces 20 and 22 which extend about a common axis. The frustoconical surface 20 is open to the wet or oil side of the seal and the frustoconical surface 22 is open to the dry or air side.

The seal includes a plurality of annularly spaced hydrodynamic pumping projections extending from the frustoconical surface 22 on the air or dry side. Instead of being called pumping projections, they may be described as flutes or rib-like raised portions or pumping elements or hydrodynamic sealing elements, all of which terms have been used in the art. Each pumping projection has a primary pumping surface 24 extending generally axially from the sealing edge 18 in spaced relationship to the second frustoconical surface 22 and a return surface 26 extending radially and upwardly from the frustoconical surface 22 to define the outer or rear extremity of the pumping projection. The outer or rear or return surface 26 extends substantially radially from the frustoconical surface 22.

The invention is characterized by a secondary pumping surface 28 extending between the primary pumping surface 24 and the return surface 26 at a shallow angle A (FIG. 3) relative to the primary pumping surface 24. Preferably the angle A would be approximately 25 degrees or less. In the free state of the integral elastomeric member 14 where it is not engaging the shaft, the primary pumping surface 24 may extend from the sealing edge 18 at a slight angle inwardly relative to the axis of the seal but when the seal is in the sealing position on the shaft, as illustrated, the member 14 is moved outwardly radially slightly so that the primary pumping surface 24 extends generally parallel with the axis of the seal. Generally, therefore, the primary pumping surface 24 extends substantially parallel to the axis of the seal but it is understood that the primary pumping surface may extend away from the axis of the seal at a slight angle with an angle A between it and the secondary pumping surface 28.

As shown in FIG. 1, the primary pumping surface 24 intersects the secondary pumping surface 28 at an outwardly projecting ridge or apex 25, the secondary pumping surface 28 intersects the return surface 26 at a radically inwardly projecting ridge or apex 27, and the return surface 26 intersects the second frustoconical surface 22 at a radially inwardly extending valley 29. Both secondary pumping surface 28 and primary pumping surface 24, at the oppositely spaced ends, intersect with the second frustoconical surface 22.

The first frustoconical surface 20 on the oil side extends from the sealing edge 18 at a steeper angle relative to the axis of the seal than the second frustoconical surface 22 on the air side, and the pumping projections are on the air side to pump oil which has leaked past the sealing edge 18 back under the sealing edge 18 to the reservoir on the oil side.

The integral elastomeric member 14 includes an annular spring groove generally radially opposite to the sealing edge 18 and a garter spring 30 is disposed in the groove to maintain the sealing edge 18 in engagement with the shaft 12.

Figure 3:
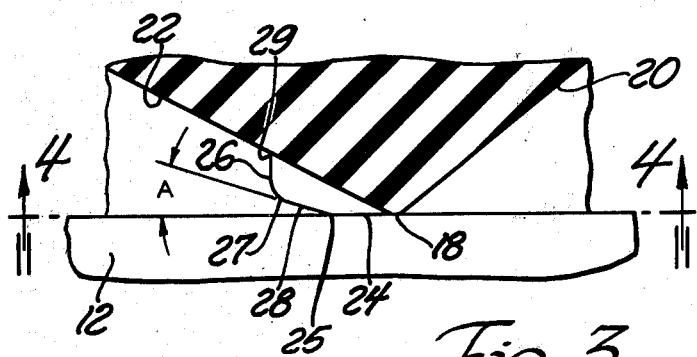
FIG. 3 is an enlarged fragmentary cross-sectional view similar to FIG. 2.
Figure 4:
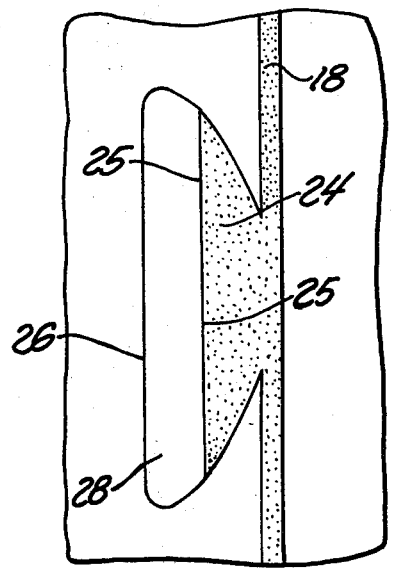
FIG. 4 is a fragmentary enlarged cross-sectional view taken substantially along line 4—4 of FIG. 3.
Figure 6:
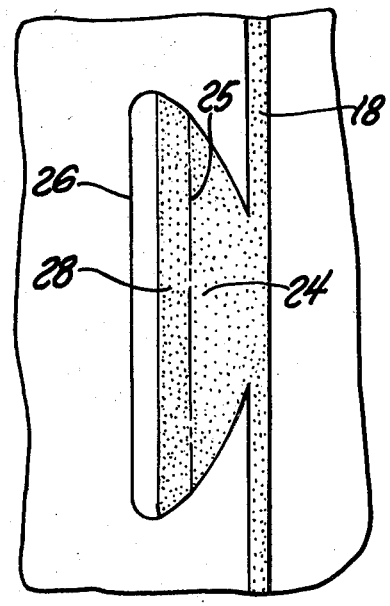
FIG. 6 is an enlarged fragmentary view taken substantially along line 6—6 of FIG. 5.
Figure 5:
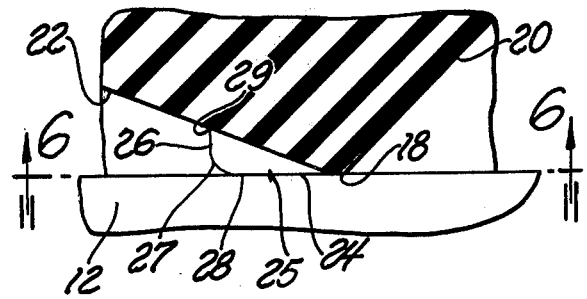
FIG. 5 is an enlarged fragmentary cross-sectional view showing the seal in running engagement with the shaft when the shaft is moved farther into engagement with the seal on one side, as compared to the opposite side.

FIG. 3 shows the seal in contact with the shaft 12 under preferred operating conditions where the shaft 12 is running concentrically with the axis of the seal 10. In this situation, the primary pumping surface 24 is in engagement with the shaft as is the sealing edge 18. This is illustrated in FIG. 4 wherein the speckled area shows that portion of the elastomeric member 14 which is in contact with the shaft 12, it being noted that the secondary pumping surface 28 is not in contact with the shaft 12. FIG. 5, however, shows the seal in contact with the shaft 12 when the shaft is running with some eccentricity relative to the axis of the seal. As illustrated in FIG. 5, the seal is shown engaging the shaft on the side of the shaft which has been moved radially into the seal whereby both the primary pumping surface 24 and the secondary pumping surface 28 are in engagement with the shaft 12. Again, this is illustrated in FIG. 6 wherein the speckled areas are the areas of the seal in contact with the shaft. At a position 180 degrees from the contact shown in FIGS. 5 and 6, the seal will be in light contact with the shaft wherein the edge 18 and the primary pumping surface 24 will remain in light contact with the shaft but sufficiently to continue pumping.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

The embodiments of the invention in which an exclusive property or privilege is claimed are defined as follows:

1. A rotary bidirectional dynamic shaft seal (10) for sealing between a pair of relatively rotatable members, one of which (12) rotates about an axis, and comprising; a radially extending annular sealing edge (18) defined by first and second converging frustoconical surfaces (20, 22) extending about a common axis; a plurality of hydrodynamic pumping projections (24, 26, 28) extending from one (22) of said frustoconical surfaces, each said pumping projection having a primary pumping surface (24) extending generally axially from said sealing edge (18) and radially outwardly from said second frustoconical surface (22) and having a return surface (26) extending radially outwardly from said second frustoconical surface (22) to define the rear extremity of said pumping projection, characterized by each said pumping projection including a secondary pumping surface (28) extending axially between said primary pumping surface (24) and said return surface (26) and radially outwardly from said primary pumping surface at a shallow angle (A) relative to said primary pumping surface (24).

2. A seal as set forth in claim 1 further characterized by said primary pumping surface (24) extending generally parallel to said axis.

3. A seal as set forth in claim 2 further characterized by said secondary pumping surface (28) extending at an angle (A) which is approximately 25 degrees or less relative to said primary pumping surface (24).

4. A seal as set forth in claim 2 further characterized by said first frustoconical surface (20) extending from said sealing edge at a steeper angle relative to said axis than said second frustoconical surface (22).

5. A seal as set forth in claim 4 further characterized by including an annular casing (16), said sealing edge (18) and frustoconical surfaces (20, 22) and said pumping projections being defined by an integral elastomeric member (14) which is supported by said casing (16).

6. A seal as set forth in claim 5 further characterized by said elastomeric member (14) having an annular spring groove generally opposite to said sealing edge (18), and an annular garter spring (30) being seated within said spring groove.

7. A seal as set forth in claim 1 further characterized by each of said pumping projections being circumferentially spaced relative to one another, each of primary pumping and secondary pumping surfaces (24, 28) of each said pumping projection merging with said second frustoconical surface (22) at the respective circumferentially spaced ends thereof, and the axially forwardmost portion of each primary pumping surface converging with said annular sealing edge (18) at a common angle therewith.

* * * * *